United States Patent [19]
Gehron

[11] 4,279,329
[45] Jul. 21, 1981

[54] SAFETY DEVICE FOR LIFT EQUIPMENT
[75] Inventor: Peter Gehron, Bensheim, Fed. Rep. of Germany
[73] Assignee: Gebr. Hofmann GmbH, KG Machinenfabrik, Darmstadt, Fed. Rep. of Germany
[21] Appl. No.: 69,766
[22] Filed: Aug. 27, 1979
[30] Foreign Application Priority Data Feb. 17, 1979 [DE] Fed. Rep. of Germany ....... 2906172

[51] Int. Cl.³ ............................................ B66B 11/04
[52] U.S. Cl. ...................................... 187/25; 254/98; 74/424.8 R; 187/8.47
[58] Field of Search ................ 187/24, 25, 8.41, 8.47; 254/7 R, 103, 98, DIG. 8, DIG. 2

[56] References Cited
U.S. PATENT DOCUMENTS

| | | | |
|---|---|---|---|
| 2,187,390 | 1/1940 | Anderson et al. | 187/24 |
| 3,309,060 | 3/1967 | Villans | 187/24 |
| 3,687,234 | 8/1972 | Gendreau | 187/25 |

FOREIGN PATENT DOCUMENTS

| | | | |
|---|---|---|---|
| 2203264 | 8/1973 | Fed. Rep. of Germany | 187/25 |
| 7334515 | 3/1974 | Fed. Rep. of Germany | 254/103 |
| 7412064 | 5/1974 | Fed. Rep. of Germany | 254/103 |
| 7621309 | 5/1974 | Fed. Rep. of Germany | 254/103 |
| 2547122 | 5/1977 | Fed. Rep. of Germany | 254/103 |

Primary Examiner—Robert J. Spar
Assistant Examiner—Kenneth Noland
Attorney, Agent, or Firm—Fleit & Jacobson

[57] ABSTRACT

A safety device for spindle-operated lifting equipment, particularly for two-post motor-vehicle lifts having a lifting nut supporting a lift carriage guided on a post, the lifting nut being itself guided on a spindle. The safety device has a safety nut guided on the spindle and located a first predetermined small distance beneath the lifting nut. Upon excessive wear of the lifting nut, the safety nut supports the lifting nut. A lock nut is guided on the spindle and located a second predetermined small distance beneath the safety nut. The safety and lock nuts are connected to each other by a spring mechanism and are forced to move or run on the spindle with the lifting nut, when the lifting nut is moving on the spindle. When the safety nut supports the lifting nut, the association between the safety and lock nuts and the spindle is such that upward movement of the safety nut and the supported lifting nut is prevented. The safety nut and supported lifting nut can only move in a downward direction on the spindle.

19 Claims, 3 Drawing Figures

SAFETY DEVICE FOR LIFT EQUIPMENT

BACKGROUND OF THE INVENTION

The invention relates to a safety device for spindle-operated lifting equipment, and, more specifically, to a safety device for two-post motor-vehicle lifts. Such lifts have a lifting nut supporting a lift carriage guided on a post. The lifting nut itself is guided on a spindle. The invention provides a safety nut positioned at a constant small distance beneath the lifting nut that moves with the lifting nut on the spindle.

DESCRIPTION OF THE PRIOR ART

The lifting nut of spindle-operated lifting equipment is a wear part so that after a certain time of operation the threads can be expected to wear out thus diminishing the frictional connection between the spindle and the lifting nut, and making the load drop. Therefore, it is nowadays usual to install a safety nut in addition to the lifting nut. The safety nut is then carried without a load being exerted under normal operating conditions. As a result, this safety nut is not subjected to wear. It is only designed to carry the load when the lifting nut has broken, or is used up. The safety nut should not permit the operation of the lifting equipment to continue after the lifting nut has failed. For security reasons, it is necessary to ensure that the load can be lowered by means of the safety nut, but any further operation should be prevented.

A large variety of safety devices for lifting equipment are known. In particular, there exist safety devices for two-post motor-vehicle lifts which operate electrically or mechanically.

With electrically operating safety devices, a limit switch is released as soon as the lifting nut drops onto the safety nut, thus interrupting the control current for the drive motors. A highly important disadvantage of this electric safety device consists in the fact that the electric interlock can be bridged with rather simple means so that the lifting equipment can be kept operating contrary to regulations.

Mechanical locking devices normally have lock pawls which will mechanically arrest the lifting equipment, should the lifting nut break (as realized according to the German utility models no. 73 34 515 and 74 12 064).

A disadvantage of such a mechanical device is that it is relatively sophisticated, and, therefore, rather expensive. Also, individual parts of the lifting posts have to be designed to stand the enormous lifting force of the drives.

Another mechanical safety device is known from the German utility model no. 76 21 309, which describes a slotted spindle engageable by lock pawls, should the lifting nut wear out or break. The disadvantage of this well-known safety device is that the spindle will be impaired after several breaks, and that impacts occur when the lock pawls engage into the slots.

Another safety device for spindle-driven lifting equipment has been described in German patent application P No. 22 03 264. This safety device has a second nut provided beneath the regulating element. When the permissible wear is exceeded, an electric switching element is actuated to interrupt lifting. But even with this equipment, the safety device can be bridged by simple measures, thus permitting the lifting equipment to be used gain. Another design of this well-known safety device shows the second nut being provided with a lot of threads to fulfill the function of a carrying nut should the carrying spindle nut itself fail. Secure locking of the lifting equipment can, however, not be granted as per the reasons set forth above. In addition, this device requires a trailing cable to be used, which can be rather complicated, and susceptible to troubles.

The German patent application P No. 25 47 122 describes a protection against turning of the supporting arms of a lift, with an irreversible lock nut being arranged beyond and/or beneath the actual supporting nut. The two nuts are connected by means of a flexible carrier bar.

With this protection device, the flexible carrier bar will always force the lock nut to contact the carrying nut, so that at least one or even both directions of rotation are blocked, which is rather unsuitable for lifts.

Therefore, the present invention provides a safety device for spindle-operated lifting equipment which is of simple construction, and which is effective in each position, that permits lowering of the lifting equipment, but prevents any further operation.

Characteristics of the safety device of the present invention are set forth in claim 1. The subclaims comprise expedient improvements of the invention.

In addition to its use in the event of break of the lifting nut at maximum permissible wear of its thread, which maximum wear can be predetermined or preset, the safety device prevents further utilization of the lifting equipment. Furthermore, this safety device will also be made use of if the spindle is damaged, that is, for example, because of excessive roughness or insufficient lubrication. Due to the precise setting of the maximum thread wear, there will be no, or only a very slight, impact when the lifting nut drops onto the safety nut, so that the dynamic loads are reduced to a minimum.

The safety device of the present invention also provides that blocking becomes effective while the lifting equipment lowers, if an obstacle is encountered beneath the carrying device, thus preventing further damage.

The additional equipment can also be made use of as a so-called foot guard since, due to the positioning of a relieving device between the lifting nut and lift carriage, the specific weight of the lift carriage and the adaptor system is almost compensated, and a permissible slight force acting towards the top makes the safety device become effective.

The invention, and its objects and advantages, will become more apparent in the detailed description of the preferred embodiments hereinafter presented.

BRIEF DESCRIPTION OF THE DRAWINGS

Two embodiments in accordance with the invention are illustrated in the accompanying drawings, in which.

DESCRIPTION OF THE PREFERRED EMBODIMENTS

Because safety devices combined with lifting equipment are well-known, the present description will be directed in particular to elements forming part of, or cooperating more directly with, the present invention. Elements not specifically shown or described herein are understood to be selectable from those known in the art.

Figure 1:
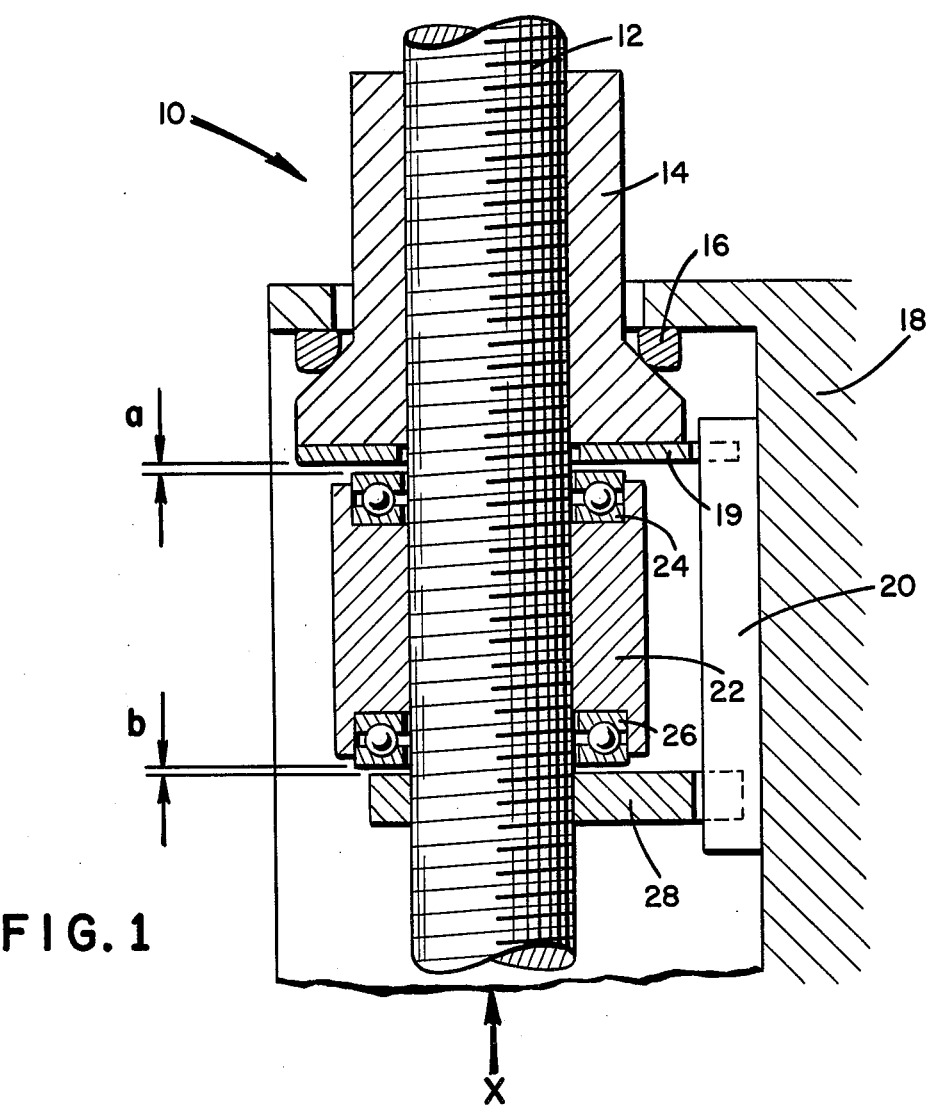
FIG. 1 is a diagrammatic view of a safety device, with the actual lifting equipment being partially represented.
Figure 2:
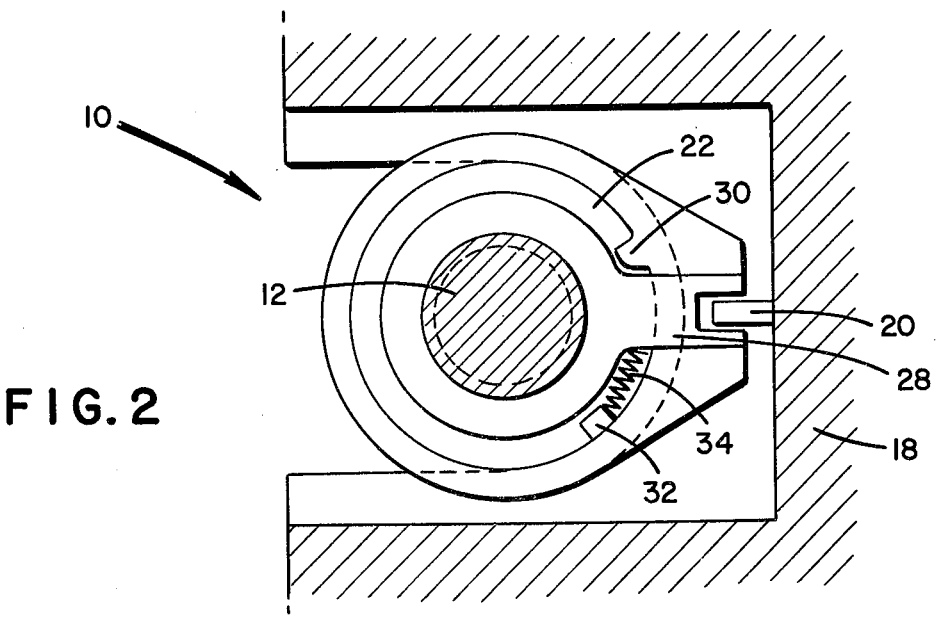
FIG. 2 is a diagrammatic top-view taken in the direction of arrow "X" in FIG. 1.

Referring now to the drawings, and to FIGS. 1 and 2 in particular, lifting equipment, generally designated 10, is illustrated. The equipment 10 comprises one or several lifting posts supporting spindles 12. The drive of the spindles 12 is performed through associated drive motors (not illustrated). The spindles 12 each guide one lifting nut 14. The lifting nut 14 supports, through a levelling piece 16, a lift carriage 18 to which individual carrying elements, with adaptors, are attachable. Preferably, a torque-receiving member, such as a plate 19, is mounted on the lifting nut 14. The torque-receiving plate 19 preferably has a recess to receive a bar 20, which, in turn, is welded to the lift carriage 18.

A safety nut 22 is provided beneath the lifting nut 14 at a distance "a". Roller bearings 24 and 26, friction bearings, or other suitable bearings are mounted on the two extremities of the safety nut 22. A lock nut 28 is provided at a distance "b" beneath safety nut 22 to press against the bar 20, when desired. As can be seen in FIG. 2, two stops 30 and 32 are preferably provided at the bottom of the safety nut 22 to support the lock nut 28. In addition, a spring element 34 is provided between the stop 32 and the lock nut 28. The connection between the spring element and the safety and lock nuts and the engagement of lock 28 with bar 20 forces the safety and lock nuts to run on the spindle with lifting nut 24.

The embodiment of the safety device, as illustrated in FIGS. 1 and 2, operates according to the following mode:

The clearance "a" between the lifting nut 14 and the safety nut 22 is selected such that when the permissible maximum wear of the thread of the lifting nut 14 is equalled or exceeded, the lifting nut is supported on the safety nut 22. Due to the loads incurring, the safety nut 22 is likely to turn with regard to the lifting nut 14, an effect which is reinforced by the roller bearing 24 on top of the safety nut 22.

Due to slight friction between the lifting nut 14 and safety nut 22, the axial load is completely transmitted to the safety nut 22. As a result, the sliding friction between the safety nut 22 and the spindle 12 exceeds the friction between the roller bearing 24 and the lifting nut 14. Thus, the lock nut 29 is forced to approach the bottom of the safety nut 22 against the spring reaction of spring element 34 when the lifting equipment is hoisted, and to lock the safety nut 22 towards the top when drive is continued. The lock effect is increased by the irreversibility between the spindle 12 and the nuts 22 and 28.

Since the friction between the safety nut 22 and the lock nut 28 is reduced to a minimum by the lower roller or friction bearing 26, rotation between the two nuts 22 and 28 is scarcely hindered.

When the lifting equipment lowers, the safety nut 22 and the lock nut 28 are unlocked again so that the lifted objects can be safely taken to the bottom. Subsequent relift, however, is prevented.

The distance "b" conforms to the spring excursion of the spring element 34. The force of the spring element 34 is preferably adjustable, and selected so that the safety device will operate at any excessive sliding resistance of the safety nut 22 on the spindle 12, whether this sliding resistance is due to any damages or insufficient lubrication of the spindle 12. In this case, the lock nut 28 will also approach the safety nut 22 from beneath, and prevent the lifting equipment from continued lifting.

Figure 3:
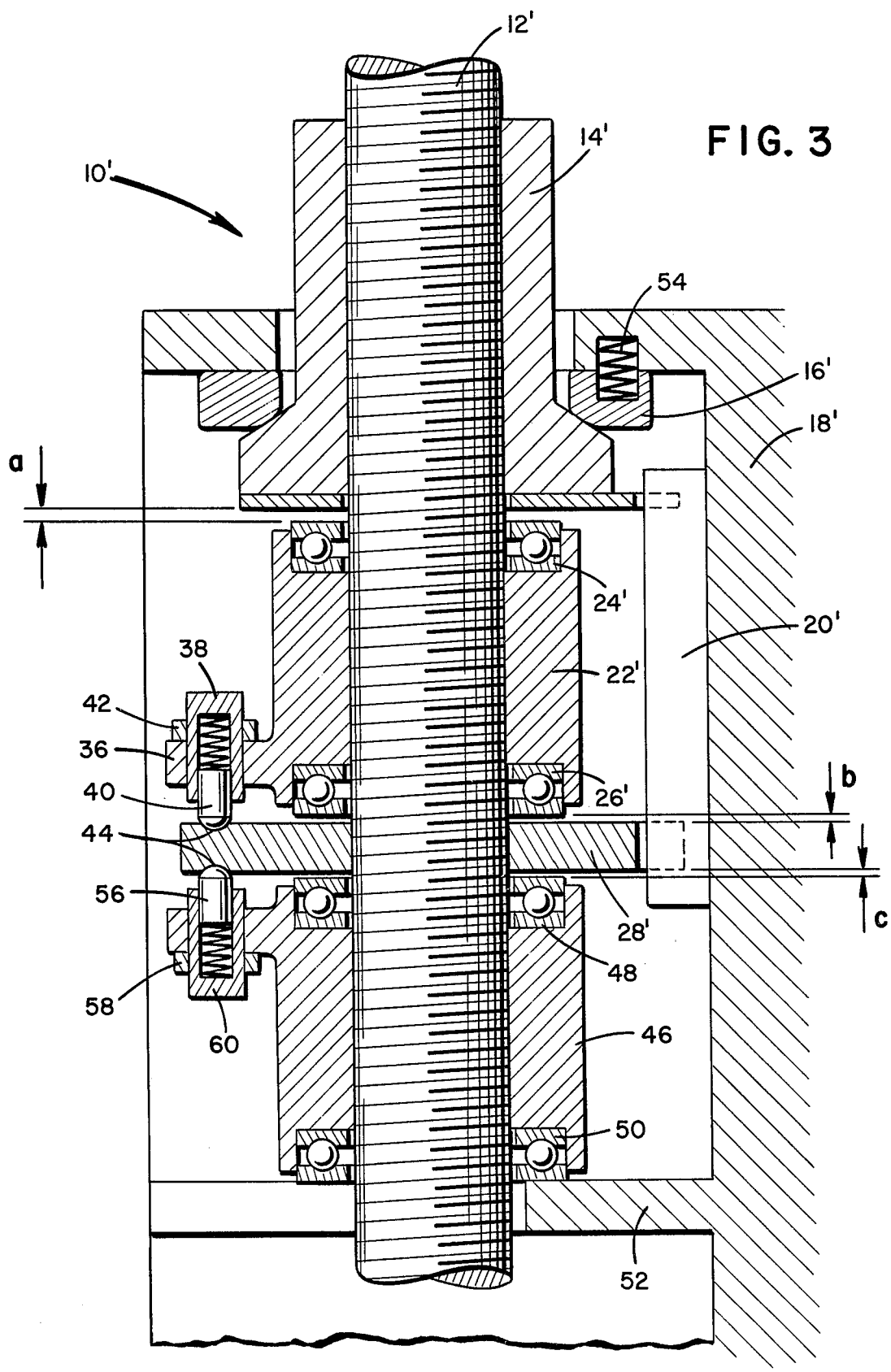
FIG. 3 is a diagrammatic view of another preferred embodiment.

FIG. 3 shows another embodiment of the invention, whereby the same parts are marked with the same numbers, with primes attached.

In this embodiment of the invention, the safety nut 22' is equipped in its lower portion with a bar 36 which is preferably provided with a bore-hole. This bore-hole receives a sleeve 38 which, in turn, guides a pin 40. A spring element 42 presses the pin 40 towards the bottom so that it can engage into a recess 44 of the lock nut 28'.

In normal operation, the safety nut 22' is carried by pin 40 which engages into recess 44 of the lock nut 28'. In the event of wear or a break of the lifting nut 14', the axial load, in turn, is received by the safety nut 22', so that the increased sliding friction between the safety nut 22' and the spindle 12' causes the spring element 42 to be pressed towards the top against the force of the spring element 42. As a result, the lock nut 28' approaches the safety nut 22' from beneath, and locks with the latter, the locking force being increased the more the lock nut approaches the safety nut.

In addition to the two illustrated devices between the lock nut 28' and the safety nut 22', it is possible to make use of other similar equipments which will keep the nuts 28' and 22' at a certain distance during normal operation, and which will make the lock nut 28' approach the safety nut 22', should the sliding friction between the safety nut 22' and the spindle 12' increase.

Beneath the lock nut 28', a second safety nut 46 is provided at a distance "c", which is preferably equal to distance "b". The safety nut 46 is provided at the top and the bottom with roller bearings 48 and 50.

Preferably, one carrying bar 52 is arranged directly on the lift carriage 18' beneath the safety nut 46, with the carrying bar 52 being directly in contact with the lower roller bearing 50 or spaced a slight distance therefrom. In normal operation, the safety nut 46 is carried similarly as described above for the safety nut 22', that is, with a sleeve 60, a pin 56, and a spring element 58 being applied. It is, however, also possible to use other devices. The above additional device can also be used as a separate safety device.

A relieving device, which preferably comprises one, or several springs, is provided between the levelling piece 16' and the lift carriage 18'.

This additional safety device operates as follows. If any objects are arranged beneath the carrying device during its descent, the lift carriage 18' and thus the carrying bar 52 are lifted so as to exert an axial force in a direction towards the top. The force is received by the safety nut 46, thus increasing the sliding friction between the safety nut 46 and the spindle 12'. As a result, the safety nut 46 approaches the lock nut 28' in a direction opposite the direction of the force exerted by the spring element 58, and locks with the lock nut in the event of a further descent so as to have movement of the lifting equipment arrested.

To employ this additional equipment as a so-called foot guard, the relieving device 54 is used to counterbalance almost the whole weight of the lift carriage 18', together with the adaptor means. If the lift carriage 18' has already reached the lower portion of the lifting equipment, and the adaptor means have been relieved, the weight is almost counterbalanced by the relieving device. Should any obstacle be placed beneath the lift carriage 18', or the adaptor means, e.g., a foot of the operator, a slight residual force of, e.g., 200 to 300 N, which is exerted towards the top will be sufficient to make the safety nut 46 approach the lock nut 28' so that the lifting equipment will be prevented from any further descent.

Previously, specific embodiments of the present invention have been described. It should be appreciated, however, that these embodiments have been described for the purposes of illustration only, without any intention of limiting the scope of the present invention. Rather, it is the intention that the present invention be limited only by the appended claims.

What is claimed is:

1. A safety device for spindle-operated lifting equipment, particularly for two-post motor-vehicle lifts having a lifting nut supporting a lift carriage guided on a post, the lifting nut being itself guided on a spindle, said safety device comprising:
   a safety nut guided on a spindle and located at a first predetermined small distance beneath a lifting nut, said safety nut supporting the lifting nut upon excessive wear of the latter;
   a lock nut guided on the spindle and located a second predetermined small distance beneath said safety nut; and
   means for forcing said safety nut and said lock nut to run on the spindle with the lifting nut when the lifting nut is moving on the spindle, said means for forcing being responsive to weight placed on said safety nut when said safety nut supports the lifting nut to prevent upward movement on the spindle of the safety nut and supported lifting nut.

2. A safety device according to claim 1, further comprising a roller or friction bearing provided at the top of said safety nut.

3. A safety device according to claim 1 or claim 2, further comprising a roller or friction bearing provided at the bottom of the safety nut.

4. A safety device according to claim 1, wherein the first predetermined small distance is adjustable according to permissible wear of the spindle thread.

5. A safety device according to claim 1, wherein said means for forcing includes spring means having a spring element for interconnecting said safety nut and said lock nut, said second predetermined distance being determined by said spring means.

6. A safety device according to claim 5, wherein said spring element is positioned in a recess of said safety nut.

7. A safety device according to claim 5, wherein the moment of the force of the spring element is slightly larger than the moment of normal sliding friction between said safety nut and the spindle.

8. A safety device according to claim 1, wherein said means for forcing includes spring means for guiding said safety nut during lowering of the lifting equipment and a fixed stop for guiding said safety nut during raising of the lifting equipment.

9. A safety device according to claim 1, further comprising a second safety nut guided on the spindle and positioned beneath said lock nut.

10. A safety device according to claim 9, further comprising spring means for guiding said second safety nut while the lifting equipment lifts, and a stop for guiding said second safety nut while the lifting equipment lowers.

11. A safety device according to claim 9, wherein said second safety nut has roller or friction bearings on both extremities.

12. A safety device according to claim 9, wherein a spring element is interposed between the lock nut, and said second safety nut.

13. A safety device according to claim 12, wherein said spring element is positioned in a recess of said second safety nut.

14. A safety device according to claim 5 or 12, wherein said spring element comprises a sleeve, a pin disposed in said sleeve, and a spring for biasing said pin, and said pin engaging into a recess formed in said lock nut.

15. A safety device according to claim 12, wherein the moment of the force of the spring element is slightly larger than the moment of normal sliding friction between said second safety nut and the spindle.

16. A safety device according to claim 9, further comprising a carrying bar attached to the lift carriage beneath said second safety nut.

17. A safety device according to claim 1, further comprising a relieving device provided between the lifting nut and the lift carriage for stopping lowering of the lift carriage.

18. A safety device according to claim 19, wherein said relieving device comprises at least one spring.

19. A safety device according to claim 17, wherein the lifting equipment includes an adaptor and wherein the force from the relieving device is slightly smaller than the weight of the lift carriage and adaptor.

* * * * *